(12) United States Patent
Ohtomo et al.

(10) Patent No.: US 7,130,035 B2
(45) Date of Patent: Oct. 31, 2006

(54) TARGET FOR SURVEYING INSTRUMENT

(75) Inventors: Fumio Ohtomo, Itabashi-ku (JP); Jun-ichi Kodaira, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 11/165,911

(22) Filed: Jun. 24, 2005

(65) Prior Publication Data

US 2006/0077380 A1 Apr. 13, 2006

(30) Foreign Application Priority Data

Sep. 27, 2004 (JP) ............................. 2004-279357

(51) Int. Cl.
*G01B 11/26* (2006.01)
*G01C 1/00* (2006.01)
(52) U.S. Cl. ................ 356/141.1; 356/3.01; 356/4.01; 356/5.01; 356/141
(58) Field of Classification Search ............. 356/141.1
See application file for complete search history.

(56) References Cited

U.S. PATENT DOCUMENTS 3,374,044 A * 3/1968 Benson ...................... 359/529
4,516,264 A * 5/1985 Corvari et al. .............. 382/101
5,237,446 A * 8/1993 Takahashi ................... 359/359
5,851,740 A * 12/1998 Sawyer ....................... 430/363
5,854,709 A * 12/1998 Couzin ....................... 359/529
2001/0036013 A1 * 11/2001 Allen et al. ................. 359/599

FOREIGN PATENT DOCUMENTS

JP 10-221073 8/1998
JP 11-083484 3/1999

* cited by examiner

*Primary Examiner*—Thomas H. Tarcza
*Assistant Examiner*—Luke D. Ratcliffe
(74) *Attorney, Agent, or Firm*—Nields & Lemack

(57) ABSTRACT

A target for a surveying instrument, which receives from the surveying instrument a laser point light indicating a position and a distance measuring light to measure a distance, comprising a reflection diffusion layer for reflecting and diffusing the distance measuring light, a wavelength filter layer for selectively transmitting the laser point light passing through the reflection diffusion layer, and a transmission diffusion layer for spreading in a given direction and for transmitting the laser point light passing through the wavelength filter layer, wherein a projecting position of the laser point light can be confirmed.

11 Claims, 3 Drawing Sheets

TARGET FOR SURVEYING INSTRUMENT

BACKGROUND OF THE INVENTION

The present invention relates to a surveying operation guidance system for providing guidance for an operator, who engages in surveying operation, e.g. for determination of a survey setting point, etc.

In a surveying operation, e.g. in a survey setting operation, an operator who operates on a surveying instrument installed at a known point (hereinafter referred as "distance measuring operator"), measures a target position for an operator on a target side (hereinafter referred as "pile driving operator"), and provides guidance the pile driving operator to move to a survey setting point (pile driving point). The position of the target is set at the survey setting point, and a pile is driven. Thus, survey setting operation requires two operators, i.e. the distance measuring operator and the pile driving operator.

As the surveying instrument, a surveying instrument of prism measurement type, using a prism mounted on a pole as a target, is now widely used.

In the surveying instruments used for survey setting operation, there are a surveying instrument which projects a distance measuring light for measuring distance and a visible laser point light for indicating a collimating direction. A target plate is mounted on a pole to ensure visual confirmation of the laser point light. When the laser point light is projected to the target plate, the projecting point of the laser point light can be confirmed. When the laser point light concurs with a center of the target plate, it is considered that the center of the target is aligned with the collimating direction.

It is designed in such manner that a prism for measuring the distance is mounted on the target plate, and that the prism is aligned with the collimating direction under the condition that the laser point light is projected to the center of the target plate.

In the past, it has been practiced as follows: When surveying operation is performed by two operators, the operator on the target side confirms deviation in a left-to-right direction and in a top-to-bottom direction based on the position on the target plate where the laser point light is projected. The distance is confirmed according to flashing of the light. In case the projecting position is deviated from the center of the target plate, the target position is corrected.

Conventionally, the laser point light and the distance measuring light have been used. The laser point light has been used to indicate a position, and the distance measuring light has been used to measure a distance, and these lights have been projected in parallel to each other. The target comprises the target plate, which diffuses the laser point light so that the laser point light can be confirmed visually, and the prism for reflecting the distance measuring light. In recent years, new types of surveying instruments appeared, i.e. a type, in which the distance measuring light is projected in non-prism mode and the laser point light and the distance measuring light are projected coaxially, and a type, in which the distance measuring light also serves as a visible laser point light.

In case of the target, in which the laser point light indicates the position, the target is made of a semitransparent material, by which the laser point light is diffused and can pass through the target. When the laser point light enters and is diffused, the laser point light can be confirmed from transmission side. When the distance measuring light is reflected by retroreflection, the distance can be measured.

Also, in the case of non-prism distance measurement, the distance is measured by a surface reflection light from an object, for which a distance is to be measured, and a reflection light is required. In general, a light amount of the reflection light from the object is not much, and the measured distance is comparatively short in the non-prism distance measurement compared with the case of the surveying instrument using a prism. Because the laser point light can be visually confirmed when the laser point light is diffused and passes through, it is difficult to confirm when the transmitting light amount is low.

JP-A-11-83484 discloses a surveying instrument for performing survey setting operation by using a prism pole, on which a prism is mounted as the target. JP-A-10-221073 discloses a distance measuring device, in which a target comprising a target plate and a prism are used and a laser point light to indicate a collimating direction is used.

SUMMARY OF THE INVENTION

It is an object of the present invention to provide a target for a surveying instrument, by which it is possible to ensure a distance measuring light amount in a non-prism type surveying instrument with a coaxial laser point light, and the transmitting laser point light can be efficiently confirmed visually. Further, it is another object of the present invention to provide a target, by which it is possible to measure a longer distance by keeping stable distance measuring light amount.

To attain the above objects, a target for a surveying instrument according to the present invention, which receives from the surveying instrument a laser point light indicating a position and a distance measuring light to measure a distance, comprises a reflection diffusion layer for reflecting and diffusing the distance measuring light, a wavelength filter layer for selectively transmitting the laser point light passing through the reflection diffusion layer, and a transmission diffusion layer for spreading in a given direction and for transmitting the laser point light passing through the wavelength filter layer, wherein a projecting position of the laser point light can be confirmed. Also, the present invention provides the target for a surveying instrument as described above, wherein the transmission diffusion layer comprises a fiber array for spreading the transmitting light in a top-to-bottom direction. Further, the present invention provides the target for a surveying instrument as described above, wherein the layers are arranged in such order as the reflection diffusion layer, the wavelength filter layer and the transmission diffusion layer from a side where the laser point light and the distance measuring light enter. Also, the present invention provides the target for a surveying instrument as described above, wherein the layers are arranged in such order as the reflection diffusion layer, the transmission diffusion layer and the wavelength filter layer from a side where the laser point light and the distance measuring light enter. Further, the present invention provides the target for a surveying instrument as described above, wherein the wavelength filter layer is a bandpass filter for transmitting a wavelength of the visible laser point light projected from the surveying instrument and for reflecting the distance measuring light. Also, the present invention provides the target for a surveying instrument as described above, wherein the reflection diffusion layer is formed on a surface of the wavelength filter layer. Further, the present invention provides the target for a surveying instrument as described above, wherein a fiber array is formed on a surface of the wavelength filter, and the fiber array is used as the transmission diffusion layer.

According to the present invention, a target for a surveying instrument, which receives from the surveying instrument a laser point light indicating a position and a distance measuring light to measure a distance, comprises a reflection diffusion layer for reflecting and diffusing the distance measurement light, a wavelength filter layer for selectively transmitting the laser point light passing through the reflection diffusing layer, and a transmission diffusion layer for spreading in a given direction and for transmitting the laser point light passing through the wavelength filter layer, wherein a projecting position of the laser point light can be confirmed. As a result, even in case the non-prism type surveying instrument is used and two operators are required for the survey setting operation, the projecting point can be confirmed on the target side, and this contributes to the improvement of working efficiency.

Also, according to the present invention, in the target for a surveying instrument as described above, the transmission diffusion layer comprises a fiber array for spreading the transmitting light in a top-to-bottom direction. Thus, because the transmitting light is spread in a top-to-bottom direction, the projecting point of the laser point light can be confirmed even when the optical axis of the laser point light does not concur with a visual line of the operator, and this contributes to the improvement of working efficiency.

Further, according to the present invention, in the target for a surveying instrument as described above, the wavelength filter layer is a bandpass filter for transmitting a wavelength of the visible laser point light projected from the surveying instrument and for reflecting the distance measuring light. Because the distance measuring light does not pass through the target, safety is assured.

Also, according to the present invention, in the target for a surveying instrument as described above, the reflection diffusion layer is formed on a surface of the wavelength filter layer. This makes it possible to have simple arrangement, and it is possible to manufacture a target for surveying instrument at low cost.

Further, according to the present invention, in the target for a surveying instrument as described above, a fiber array is formed on a surface of the wavelength filter, and the fiber array is used as the transmission diffusion layer. This makes it possible to have simple arrangement and to have reflection of the distance measuring light effectively from the target.

DETAILED DESCRIPTION OF THE PREFERRED EMBODIMENTS

Figure 1:
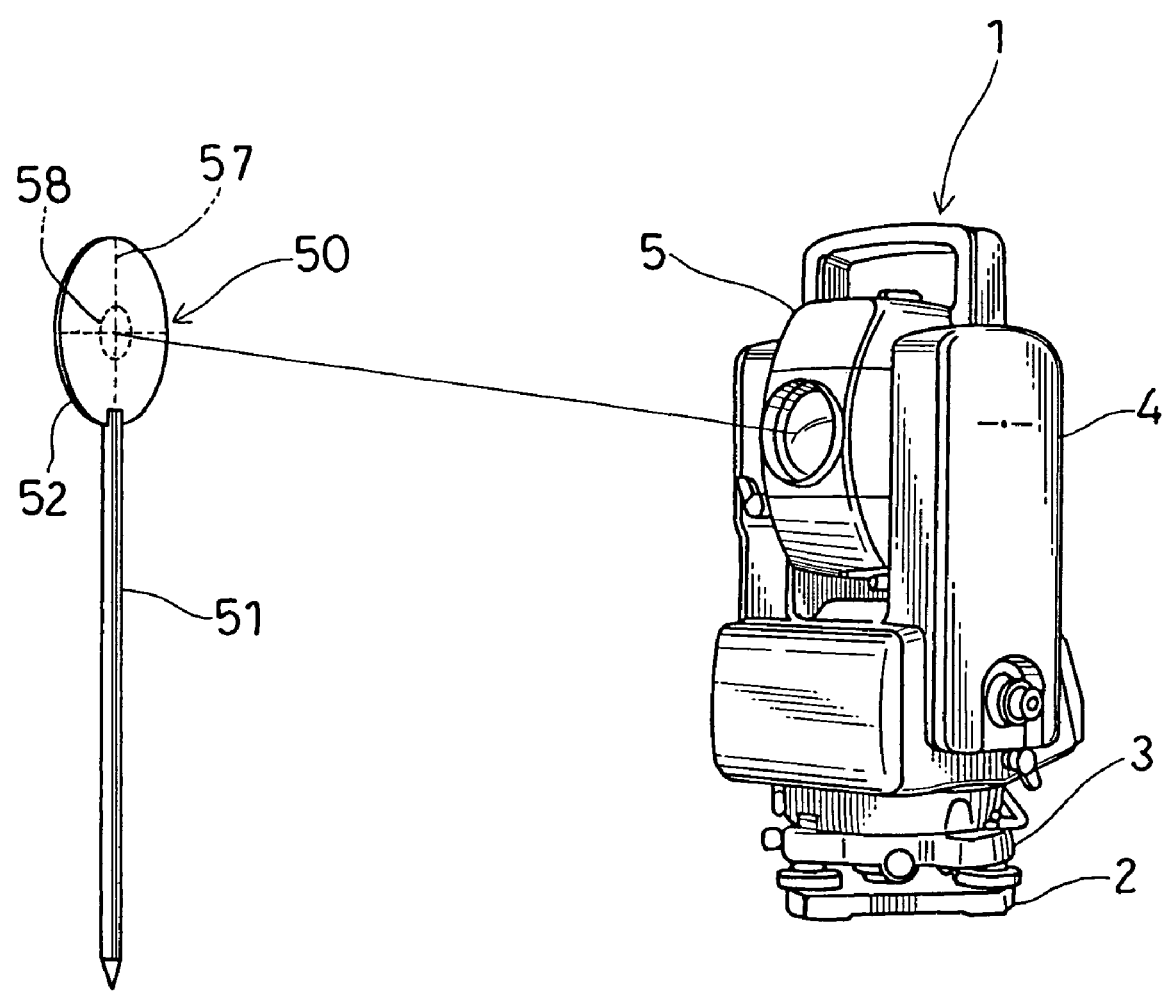
FIG. 1 is a general schematical perspective view of an embodiment of the present invention.

Description will be given below on the best mode of the invention for carrying out the present invention referring to the drawings.

FIG. 1 represents a surveying instrument 1 and a target 50 according to the present invention.

The surveying instrument 1 comprises a leveling unit 2 mounted on a tripod (not shown in the drawings), a base unit 3 mounted on the leveling unit 2, a frame unit 4 rotatably mounted around a vertical axis on the base unit 3, and a telescope unit 5 rotatably mounted around a horizontal axis on the frame unit 4. An optical system to be described later is accommodated in the telescope unit 5.

Figure 2:
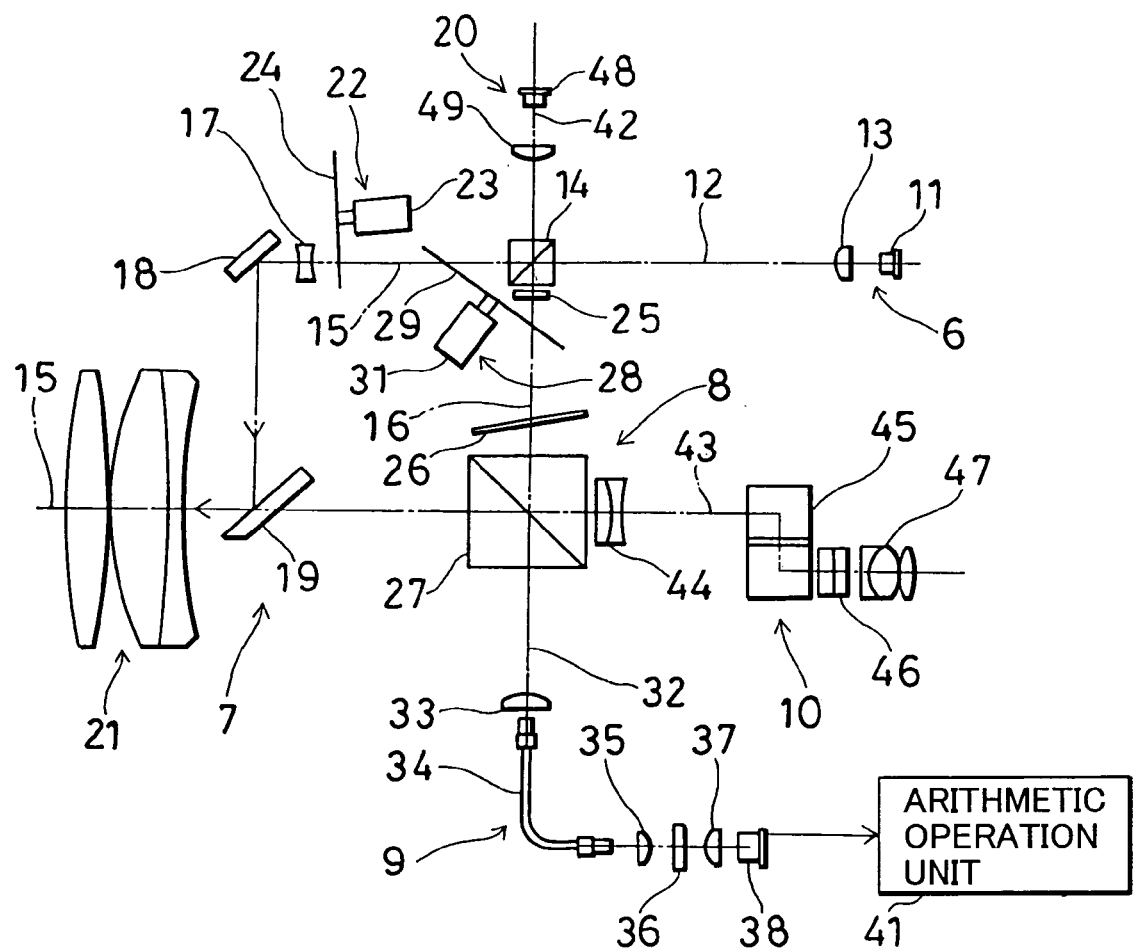
FIG. 2 is a schematical block diagram of a non-prism type surveying instrument, which is an example of the surveying instrument used in the present embodiment.

First, description will be given on a non-prism type surveying instrument to be used in the present invention referring to FIG. 2.

In the figure, reference numeral 6 represents a light source unit, 7 represents a projection optical system, 8 represents an internal reference optical system, 9 represents a photodetection optical system, 10 represents an ocular optical system (telescope), and 20 represents a laser point light source unit.

Now, description will be given below on the light source unit 6.

Figure 3:
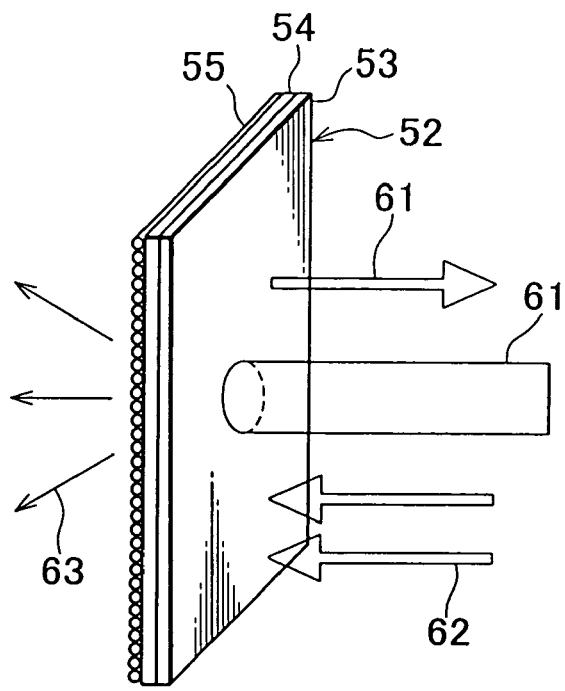
FIG. 3 is a drawing to explain a target plate in a first embodiment of the present invention.

A laser light source 11 emits a distance measuring light 61, e.g. an infrared light of 780 nm (See FIG. 3). On an optical axis 12 of the laser light source 11, there are provided a first collimator lens 13 and a beam splitter 14.

The beam splitter 14 splits the optical axis 12 to a projection light optical axis 15 and an optical axis 16 for internal reference, and the projection optical system 7 is composed on the projection light optical axis 15.

On the projection light optical axis 15, there are arranged a concave lens 17, a first optical path deflecting member 18, a second optical path deflecting member 19, and an objective lens 21. A projection light amount adjusting means 22 is provided between the beam splitter 14 and the concave lens 17.

The projection light amount adjusting means 22 is rotated by a light amount adjusting motor 23, which has a function for positioning of a stepping motor or the like. The light amount adjusting means 22 comprises a light amount adjusting plate 24, in which a transmission light amount is continuously changed in a circumferential direction. The light amount adjusting plate 24 is provided in such manner that the light amount adjusting plate 24 intercepts the projection light optical axis 15.

The concave lens 17 is arranged so that a focusing position of the concave lens 17 concurs with a focusing position of the objective lens 21. Together with the objective lens 21, the concave lens 17 makes up a beam expander, and the beam expander is designed to spread and project a parallel luminous flux, which are guided up to the concave lens 17. Accordingly, it is possible to minimize the influence by optical components such as the beam splitter 14, the light amount adjusting plate 24, etc. Also, compared with a structure where the laser light source 11 is positioned at the focusing position of the objective lens 21, light projection efficiency is improved.

The beam splitter 14 transmits almost totally the distance measuring light (infrared light) from the laser light source 11, and the beam splitter 14 reflects a part of the distance measuring light. The first optical path deflecting member 18 and the second optical path deflecting member 19 are mirrors or the like for totally reflecting the distance measuring light.

Description will be given below on the internal reference optical system 8.

The internal reference optical system 8 is provided between the light source unit 6 and the photodetection optical system 9 as to be described later. The internal reference optical system 8 comprises a condenser lens 25, a density filter 26, and a dichroic prism 27 which are arranged on the optical axis 16 of the internal reference light.

A Chopper means 28 is arranged so as to stretch over between the projection light optical axis 15 and the internal reference light optical axis 16. The chopper means 28 comprises a chopper plate 29 for intercepting the projection light optical axis 15 and the internal reference light optical axis 16 and a chopper motor 31, which can rotate the chopper plate 29 and can position the chopper plate 29. Under the condition where the chopper plate 29 intercepts the projection light optical axis 15, the distance measuring light can pass along the internal reference light optical axis 16. Under the condition where the chopper plate 29 intercepts the internal reference light optical axis 16, the distance measuring light can pass along the projection light optical axis 15.

By rotating the chopper plate 29, it can be alternatively selected that the distance measuring light from the light source unit 6 is projected along the projection light optical axis 15 or the distance measuring light is projected along the internal reference light optical axis 16 as an internal reference light.

The density filter 26 adjusts light intensity of the internal reference light so that light intensity of a reflected distance measuring light from a target plate 52 (See FIG. 1) is approximately equal to the light intensity of the internal reference light.

Now, description will be given on the photodetection optical system 9.

The photodetection optical system 9 has a photodetection optical axis 32, which is aligned with an extension of the internal reference light optical axis 16. On the photodetection optical axis 32, there are arranged the dichroic prism 27, a condenser lens 33, a photodetection fiber 34, a second collimator lens 35, an interference filter 36, a condenser lens 37, and a photodetection element 38. As the photodetection element 38, an avalanche photodiode (AFD) is used, for instance. The interference filter 36 has such a characteristic as to transmit a light of an oscillation wavelength of the light from the laser light source 11. When the photodetection element 38 receives the reflected distance measuring light, a photodetection signal is sent to an arithmetic operation unit 41. At the arithmetic operation unit 41, a distance to the target plate 52, i.e. a distance to the target 50, is calculated based on the photodetection signal.

When the parallel luminous flux enters, the objective lens 21 converge the luminous flux to an incident surface of the photodetection fiber 34.

Description will be given now on the ocular optical system 10.

The ocular optical system 10 has an ocular optical axis 43, and the ocular optical axis 43 is aligned with an extension of the optical axis of the objective lens 21, which passes through the dichroic prism 27. Along the ocular optical axis 43, there are provided a focusing lens 44 movably arranged along the ocular optical axis 43, an erect prism 45 for converting an image to an erect image, a collimating plate 46 with lines for collimation such as cross lines, and an ocular lens 47.

The laser point light source unit 20 has a laser point light optical axis 42, which is positioned on an extension of the internal reference light optical axis 16 after transmitting the beam splitter 14. The laser point light source unit 20 comprises a laser point light emitting element 48 and a condenser lens 49 arranged on the laser point light optical axis 42. The laser point light emitting element 48 emits a visible laser light such as a red laser light or a green laser light, etc. Together with the concave lens 17 and the objective lens 21, the condenser lens 49 turns a laser point light 62 (See FIG. 3) emitted from the laser point light emitting element 48 into a parallel luminous flux, and the luminous flux is projected along the projection light optical axis 15.

Next, description will be given on the target 50 referring to FIG. 1 and FIG. 3.

The target 50 comprises a pole 51, and the target plate 52 attached on a top end of the pole 51. FIG. 3 shows a part of the target plate 52.

The target plate 52 is designed in a three-layer structure. A first layer is a reflection diffusion layer 53, which reflects and diffuses the distance measuring light. A second layer is a wavelength filter layer 54 for transmitting a visible laser point light, and a third layer is a transmission diffusion layer 55, which spreads and transmits the transmitting luminous flux in a given direction, e.g. in a top-to-bottom direction.

A surface of the reflection diffusion layer 53 comprises fine projections and recessions, for instance. The distance measuring light is efficiently diffused and reflected, and the reflection diffusion layer 53 allows the laser point light to pass. In case the laser point light is a laser light identical with the distance measuring light, the laser light is split in such manner that the reflected diffused light acts as the distance measuring light, and the transmitting laser light acts as the laser point light.

The wavelength filter layer 54 is a transmission filter to selectively and efficiently transmit the laser point light. For example, the wavelength filter layer 54 is a color filter, which transmits a wavelength of a red laser light. The wavelength filter layer 54 is preferably made of a substantially semitransparent material so that a laser light with directivity can be confirmed.

The transmission diffusion layer 55 spreads the transmitting laser light in a top-to-bottom direction and increases visibility in a top-to-bottom direction. The transmission diffusion layer 55 is, for instance, a fiber array consisting of fibers continuously aligned.

Further, the reflection diffusion layer 53 reflects and diffuses the incident laser light, and the reflection diffusion layer 53 may be formed on a surface of the color filter.

On a surface of the target plate 52 on the other side of the surveying instrument (hereinafter referred as "rear surface"), cross lines 57 to indicate the center of the target and a circular line 58 enclosing the region near the center are marked by means as necessary such as engraving, printing, etc.

When the laser point light 62 emitted from the surveying instrument is projected to the target plate 52, the light passes through the reflection diffusion layer 53 and is diffused. Because the laser point light 62 passes through the wavelength filter layer 54, red color is developed. A projecting position of the laser point light 62 can be confirmed from the rear surface of the target plate 52 through the transmission diffusion layer 55. Also, through comparison with the cross lines 57 and the circular line 58, deviation of the projecting position from the target center can be confirmed. Even when no guidance is provided from an operator for distance measurement, a pile driving operator can correct the position of the target 50 by himself. A laser point light 63 passing through the wavelength filter layer 54 is diffused in a top-to-bottom direction by the transmission diffusion layer 55. Thus, the projecting position of the laser point light 62 can be confirmed from a direction, which is deviated in a top-to-bottom direction with respect to the direction of the optical axis of the laser point light.

Now, description will be given on operation.

The laser point light 62 is emitted from the laser point light emitting element 48. By referring to an angle display, the angle of the surveying instrument 1 is aligned with a predetermined direction. Instruction is given to the target side so that the target is aligned with the laser light. When the target is aligned with the laser beam, distance measurement is started. Instruction is given by the laser point light depending on the error in distance, and the target is guided to a predetermined position.

The laser point light 62 passes through the reflection diffusion layer 53. Because the laser point light 62 passes through the wavelength filter layer 54, red color develops, and this indicates the position. Then, the projecting position of the laser point light can be confirmed by the pile driving operator from the rear surface of the target plate 52.

The transmission diffusion layer 55 diffuses the laser point light 63, which passes through the wavelength filter layer 54, in a top-to-bottom direction. The pile driving operator can confirm the projecting position of the laser point light 63 even from a direction deviated in a top-to-bottom direction with respect to the direction of the optical axis of the laser point light, and this contributes to the improvement of working efficiency.

The pile driving operator can confirm by himself the projecting position of the laser point light 62 on the target plate 52. Thus, even when no instruction is given from the distance measuring operator at the surveying instrument 1, the position of the pole 51 can be set so that the laser point light 62 is directed toward the center of the target plate 52, i.e. toward an intersection of the cross lines 57.

Under the condition that the laser point light 62 is projected to the target plate 52, distance measurement can be performed.

The distance measuring light 61 emitted from the laser light source 11 passes through the beam splitter 14 and is projected toward the target plate 52 by the projection optical system 7.

The distance measuring light 61 is projected to the target plate 52 via the projection optical system 7. The reflected distance measuring light, which is reflected by the target plate 52, enters from the objective lens 21, and the reflected distance measuring light is reflected by the dichroic prism 27 and the light runs along the photodetection optical axis 32.

When the reflected distance measuring light enters the photodetection fiber 34 and is guided to the collimator lens 35 by the photodetection fiber 34, the reflected distance measuring light is turned to a parallel luminous flux by the second collimator lens 35. The interference filter 36 cuts off disturbance light, and the reflected distance measuring light is converged to the photodetection element 38 by the condenser lens 37. The photodetection element 38 receives the distance measuring light with high S/N ratio.

The light amount adjusting motor 23 rotates the light amount adjusting plate 24 depending on the distance measurement. The intensity of the distance measuring light projected by the light amount adjusting plate 24 is adjusted so that the intensity of the reflected distance measuring light received at the photodetection element 38 is adjusted to a constant value regardless of a distance to the target 50. The chopper means 28 switches over the optical path so that the distance measuring light is projected to the object to be measured or so that the distance measuring light is projected to the photodetection optical system 9 as the internal reference light. The density filter 26 adjusts the light intensity of the internal reference light so that the light intensity of the internal reference light is approximately equal to the light intensity of the reflected distance measuring light.

The photodetection element 38 transmits photodetection signals of the reflected distance measuring light and the internal reference light to the arithmetic operation unit 41, and the arithmetic operation unit 41 calculates the distance to the target 50 based on the photodetection signals from the photodetection element 38. As described above, the disturbance light except the light of wavelength range of the reflected distance measuring light is removed by the interference filter 36, and the reflected distance measuring light received by the photodetection element 38 has high S/N ratio, and the distance can be measured with high accuracy.

When the distance value thus measured is a predetermined value, a survey setting point is determined, and a pile is driven. Further, the procedure is repeated for a next survey setting point.

Figure 4:
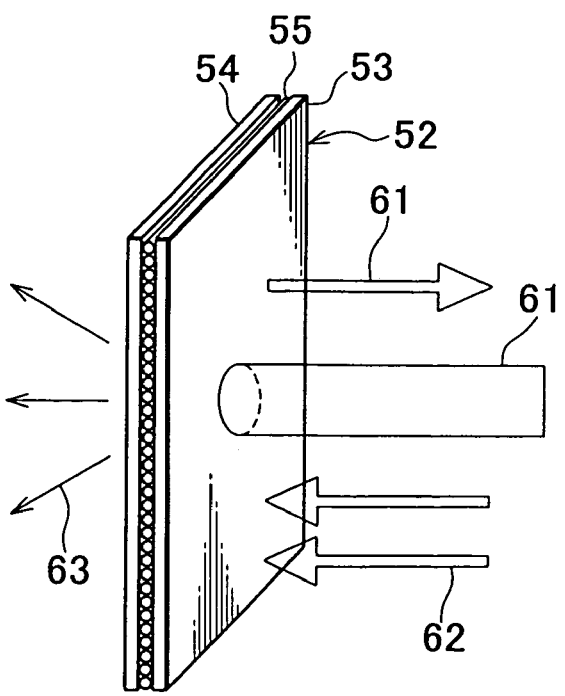
FIG. 4 is a drawing to explain a target plate in a second embodiment of the present invention.

FIG. 4 shows the target plate 52 in a second embodiment. A first layer is a reflection diffusion layer 53 to transmit light. A second layer is a transmission diffusion layer 55 to spread a luminous flux in a top-to-bottom direction, and a third layer is a wavelength filter layer 54. In the second embodiment, too, the projecting position of the laser point light 62 is confirmed from the rear surface of the target plate 52. The laser point light 63 passing through the wavelength filter layer 54 is diffused in a top-to-bottom direction by the transmission diffusion layer 55. Thus, it is possible to confirm the projecting position of the laser point light 62 even from a direction deviated in a top-to-bottom direction with respect to the direction of the optical axis of the laser point light.

Because the transmission diffusion layer 55 comprising a fiber array is arranged behind the reflection diffusion layer 53, satisfactory effects can be obtained in the measurement of long distance because of retroreflection effects of the fiber array.

A third embodiment has the same arrangement as in the first embodiment except that the target uses a bandpass filter instead of the wavelength filter layer 54, which is a color filter. The bandpass filter is composed so as to transmit only a light of a necessary wavelength range, and excessive miscellaneous light components can be suppressed. The bandpass filter may be formed as a membrane, and the bandpass filter may be provided on the color filter.

A fourth embodiment of the invention has the same arrangement as in the second embodiment except that the target uses a bandpass filter instead of the wavelength filter layer 54, which is a color filter. The effects due to the use of the bandpass filter are the same as described above.

It would suffice that the reflection diffusion layer 53 of the target plate 52 has a surface with diffusion effects. Thus, the reflection diffusion layer 53 may be formed, for instance, in such manner that metal powder such as aluminum powder, etc. is coarsely spread in such degree as not to impair light transmittance on a surface of a transparent red plastic plate. Or the reflection diffusion layer 53 with retroreflection effects may be formed by spreading glass powder.

In the first and the third embodiments, the structure consisting of three layers may be integrated. The reflection diffusion layer 53 reflects and diffuses the incident laser light, and the reflection diffusion layer 53 may be formed on the surface of the wavelength filter layer 54. Or, the function of the transmission diffusion layer 55, which comprises a fiber array to diffuse the laser light upward and downward, may be designed on the surface of the bandpass filter. For example, the transmission diffusion filter 55 may be designed as a lenticular lens in form of a cylindrical lens. Integration can be accomplished by forming the reflection diffusion layer 53 on one surface of the wavelength filter layer 54 and by providing the other surface with the function of the transmission diffusion layer 55.

In the above, description has been given on a case where the surveying instrument 1 is of non-prism type, while it goes without saying that the present invention can also be applied to a target to be used on a surveying instrument of prism type.

What is claimed is:

1. A target for a surveying instrument, wherein the target receives from the surveying instrument a visible laser point light indicating a position and a distance measuring light to measure a distance, and the surveying instrument projects said visible laser point light and said distance measuring light on the same optical axis, comprising a reflection diffusion layer for reflecting and diffusing the distance measuring light, a wavelength filter layer for selectively transmitting the laser point light passing through said reflection diffusion layer, and a transmission diffusion layer for spreading in a given direction and for transmitting the laser point light passing through said wavelength filter layer, wherein said reflection diffusion layer, said wavelength filter layer and said transmission diffusion layer are formed as a layered structure, said target has a mark for indicating a center position of said target and a projecting position of said laser point light can be confirmed against said center position of said target.

2. A target for a surveying instrument according to claim 1, wherein said transmission diffusion layer comprises a fiber array for spreading the transmitting light in a top-to-bottom direction.

3. A target for a surveying instrument according to claim 1, wherein said wavelength filter layer is a bandpass filter for transmitting a wavelength of the visible laser point light projected from the surveying instrument and for reflecting the distance measuring light.

4. A target for a surveying instrument according to claim 1, wherein said reflection diffusion layer is formed on a surface of said wavelength filter layer.

5. A target for a surveying instrument according to claim 1, wherein a fiber array is formed on a surface of said wavelength filter, and the fiber array is used as said transmission diffusion layer.

6. A target for a surveying instrument, wherein the target receives from the surveying instrument a visible laser point light indicating a position and a distance measuring light to measure a distance, and the surveying instrument projects the visible laser point light and the distance measuring light on the same optical axis, comprising a reflection diffusion layer for reflecting and diffusing the distance measuring light, a wavelength filter layer for selectively transmitting the laser point light passing through said reflection diffusion layer, and a transmission diffusion layer for spreading in a given direction and for transmitting the laser point light passing through said wavelength filter layer, wherein said layers are arranged in the order of said reflection diffusion layer, said wavelength filter layer and said transmission diffusion layer from a side where the laser point light and the distance measuring light enter, and wherein the target has a mark for indicating a center position of the target and a projecting position of the laser point, light can be confirmed against the center position of the target.

7. A target for a surveying instrument, wherein the target receives from the surveying instrument a visible laser point light indicating a position and a distance measuring light to measure a distance, and the surveying instrument projects the visible laser point light and the distance measuring light on the same optical axis, comprising a reflection diffusion layer for reflecting and diffusing the distance measuring light, a wavelength filter layer for selectively transmitting the laser point light passing through said reflection diffusion layer, and a transmission diffusion layer for spreading in a given direction and for transmitting the laser point light passing through said wavelength filter layer, wherein said layers are arranged in the order of said reflection diffusion layer, said transmission diffusion layer and said wavelength filter layer from a side where the laser point light and the distance measuring light enter, and wherein the target has a mark for indicating a center position of the target and a projecting position of the laser point light can be confirmed against the center position of the target.

8. A target for a surveying instrument according to claim 6 or 7, wherein said transmission diffusion layer comprises a fiber array for spreading the transmitting light in a top-to-bottom direction.

9. A target for a surveying instrument according to claim 6 or 7, wherein said wavelength filter layer is a bandpass filter for transmitting a wavelength of the visible laser point light projected from the surveying instrument and for reflecting the distance measuring light.

10. A target for a surveying instrument according to claim 6 or 7, wherein a fiber array is formed on a surface of said wavelength filter, and said fiber array is used as said transmission diffusion layer.

11. A target for a surveying instrument according to claim 6, wherein said reflection diffusion layer is formed on a surface of said wavelength filter layer.

* * * * *